United States Patent [19]

Kunkel et al.

[11] Patent Number: 4,707,902

[45] Date of Patent: Nov. 24, 1987

[54] MECHANISM FOR ACCURATE REGISTER ALIGNMENT OF A BLANKET ON A BLANKET OR PLATE CYLINDER

[75] Inventors: Fred Kunkel, Offenbach; Herbert Rebel, Rodgau, both of Fed. Rep. of Germany

[73] Assignee: M.A.N.-Roland Druckmaschinen Aktiengesellschaft, Fed. Rep. of Germany

[21] Appl. No.: 943,251

[22] Filed: Dec. 17, 1986

[30] Foreign Application Priority Data

Dec. 20, 1985 [DE] Fed. Rep. of Germany ....... 3545172

[51] Int. Cl.[4] .............................................. B23Q 16/00

[52] U.S. Cl. ........................................ 29/417; 29/407; 29/720

[58] Field of Search ................. 29/714, 720, 407, 283, 29/DIG. 42; 254/199; 427/171, 172, 173, 174, 175, 176, 428

[56] References Cited

U.S. PATENT DOCUMENTS

| | | | |
|---|---|---|---|
| 4,327,527 | 5/1982 | Seelig et al. | 29/407 X |
| 4,408,389 | 10/1983 | Henein | 29/407 X |
| 4,602,413 | 7/1986 | Krauss et al. | 29/407 X |
| 4,607,421 | 8/1986 | Zemek et al. | 29/714 X |

*Primary Examiner*—Howard N. Goldberg
*Assistant Examiner*—Ronald S. Wallace
*Attorney, Agent, or Firm*—Leydig, Voit & Mayer

[57] ABSTRACT

For the accurate register alignment of a blanket on a blanket or plate cylinder for selected-area, in-line varnishing in a rotary press, clamping devices are provided with registration means each comprising two axially spaced, radially directed register pins which are situated beneath the outer surface of the cylinder and cooperate in exact register with recesses provided in the associated ends of the blanket. The clamping device for the front blanket end is adapted to be fixed in a zero position by means of associated markings at the front blanket end and an associated marking on the blanket or plate cylinder. The two clamping devices together with the rotatable tensioning spindles are disposed to be axially displaceable in the plate cylinder by means of adjusting devices.

3 Claims, 9 Drawing Figures

MECHANISM FOR ACCURATE REGISTER ALIGNMENT OF A BLANKET ON A BLANKET OR PLATE CYLINDER

FIELD OF THE INVENTION

The invention relates to a mechanism for the accurate register alignment of a blanket on a blanket or plate cylinder for selected-area, in-line varnishing in a rotary press.

BACKGROUND OF THE INVENTION

In one of the best-known constructions for clamping or tensioning a rubber blanket, the two ends of the blanket are provided with clamping devices which engage in grooves of two tensioning spindles. The blanket is tensioned by turning the spindles via a worm drive by means of a torque spanner. The ends of the blanket are fixed with the clamping devices by the fact that the blanket is screwed between clamping strips. These clamping strips are retained in the tensioning spindle grooves by a positive connection.

When varnishing in a rotary press, it is sometimes necessary to leave some areas of the sheet untouched. For example, on areas of the sheet occupied by adhesive tabs must not be covered by varnish. To accomplish the varnishing in only the desired areas, a varnishing process commonly called selected-area, in-line varnishing is typically employed. For selected-area, in-line varnishing, the offset blanket (required with the direct varnishing method) is usually one in which the top layer of the rubber blanket has been removed at those areas which are not to be varnished. A blanket prepared in this way can also be used for the indirect varnishing method if a plate cylinder is rolled in a dispersion varnish on an aqueous basis over the entire area.

For accurate work, the position of those parts of the varnishing blanket which are not to provide a varnish, (i.e., those parts which are to be cut out) is established by applying to the dry varnish blanket an ink impression of the ink plate thereby providing the guide lines for cutting. To cut out the corresponding area in the blanket is time-consuming and lengthens the downtime. Unclamping the blanket after it has received the ink impression, so that it can be cut out at the same time the ink plates of the in-line press are being made ready is always time-consuming because the blanket has to be reclamped in position.

OBJECTS AND SUMMARY OF THE INVENTION

The object of the invention is to provide a device which eliminates the expensive make-ready operation when a blanket prepared in the foregoing way is clamped into position, while at the same time providing for accurate and circumferential readjustment of the blanket.

Other objects and advantages of the invention will be apparent from the drawings and the following detailed description.

An orientation aid is provided that greatly facilitates accurate register alignment of a blanket for selected-area, in-line varnishing on a blanket or a plate cylinder without circumferential and side register. To obtain accurate register varnishing there is practically no need for time-consuming adjustment, although the system also allows alignment. Thus corrections are possible both circumferentially and axially, e.g., when the blanket has to be retensioned after a relatively large number of varnishing runs or has to be readjusted to compensate for any registration inaccuracies in order to establish the exact position of the areas for varnishing in relation to the ink plate.

One exemplified embodiment of the invention will be described in detail hereinafter with reference to the drawings.

While the invention will be more fully described and disclosed in connection with certain preferred embodiments and procedures, it is not intended to limit the invention to those specific embodiments.

DETAILED DESCRIPTION OF THE PREFERRED EMBODIMENT

Figure 1:
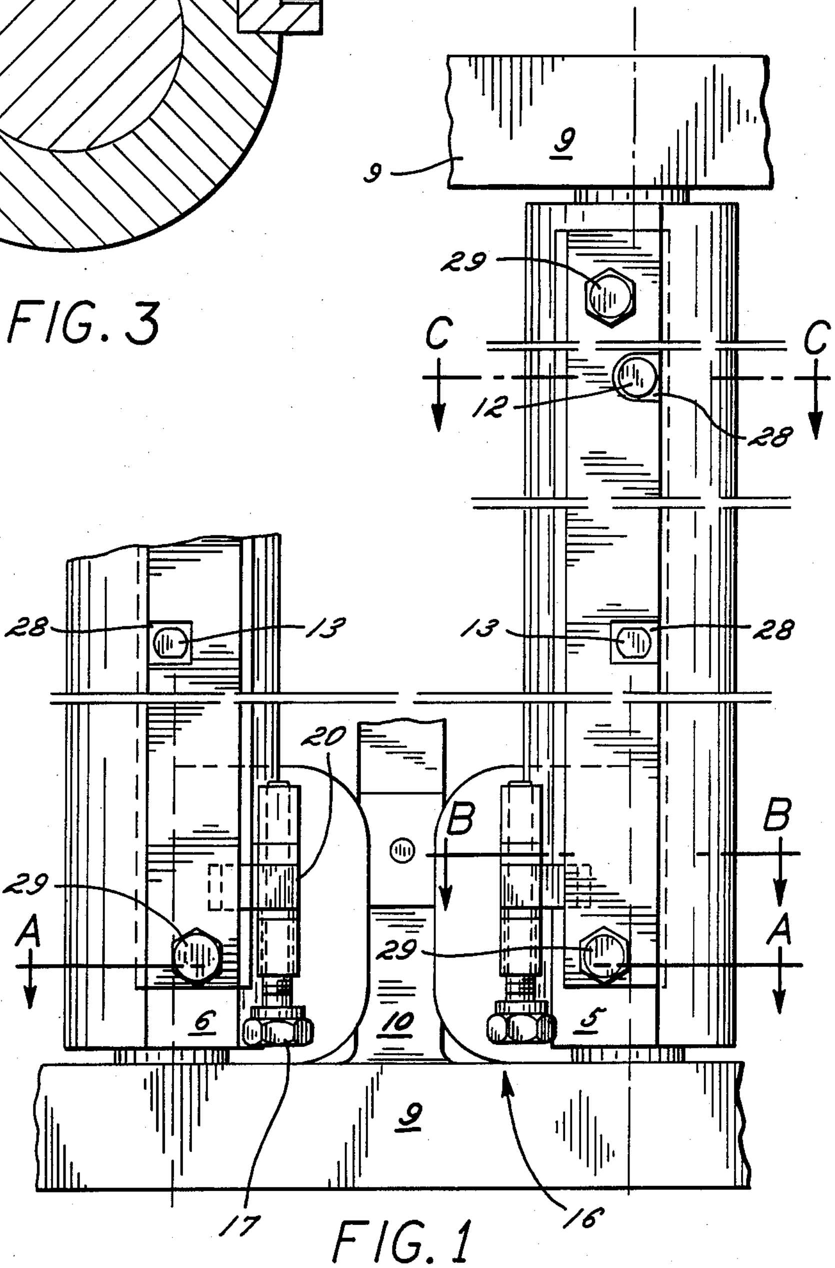
FIG. 1 is a plan view of a blanket or plate cylinder with a mechanism according to the invention.
Figure 2:
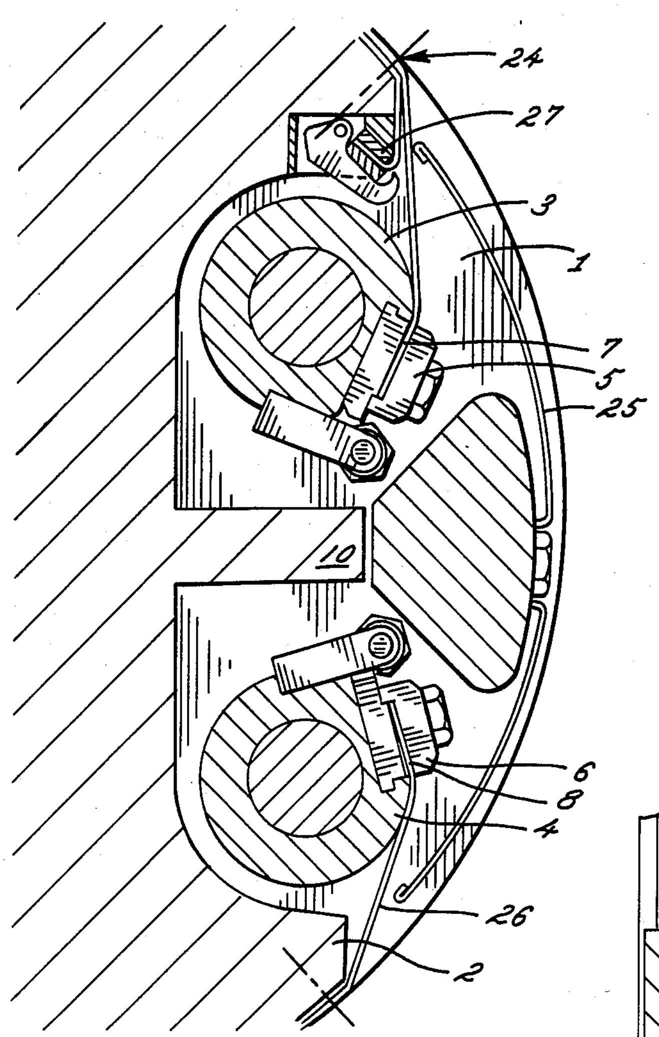
FIG. 2 is an enlarged sectional view taken along the line A—A in FIG. 1.

Turning to the drawings and referring first to FIGS. 1 and 2, two tensioning spindles 3, 4 are disposed in an axis-parallel well 1 of the blanket or plate cylinder 2 and are mounted for rotation in end walls 9 of the blanket or plate cylinder 2. Each spindle 3, 4 carries a clamping device 5, 6, respectively, for the ends 7, 8 of the rubber blanket 26. The latter is tensioned by turning the spindles 3, 4 via a worm drive, e.g., by turning the spindle 3 via the worm drive 11 shown in FIG. 9. A well wall web 10, a well cover 28 and a holder 27 for underlay sheets are also provided in known manner.

Figure 6:
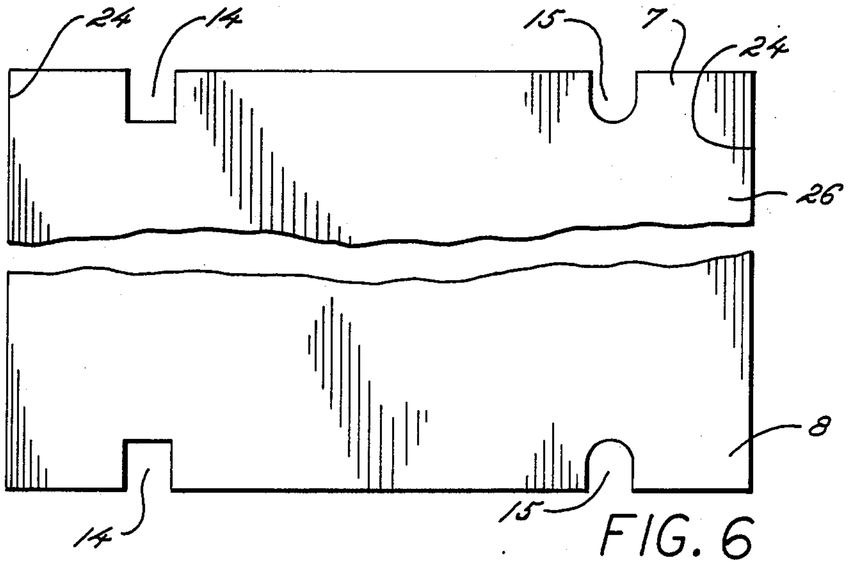
FIG. 6 shows two ends of a blanket with registration means provided according to the invention.
Figure 7:
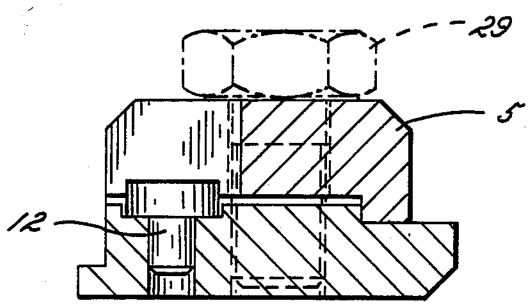
FIG. 7 is an enlarged partial view of the blanket cylinder taken along the line C—C in FIG. 1.
Figure 8:
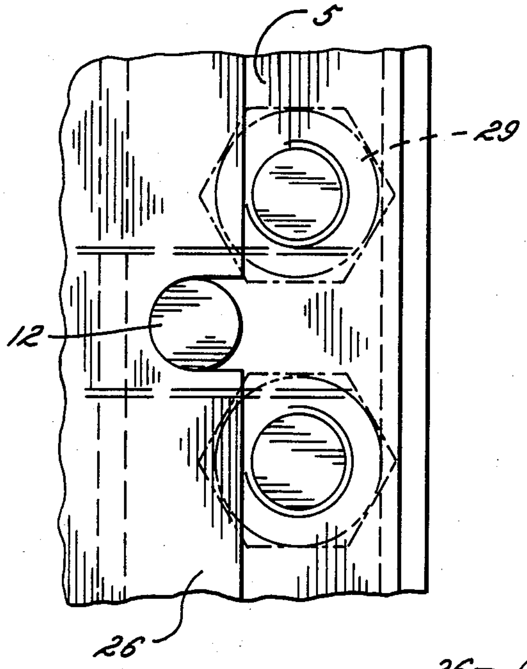
FIG. 8 is an enlarged partial view of the blanket inserted in a clamping device of the blanket cylinder.

According to the invention, each clamping device 5 or 6 is provided with registration means comprising two axially spaced radially directed register pins 12, 13 which are situated beneath the outer surface of the cylinder 2 in the bottom clamping device 5, 6 and with each of the register pins there cooperates in exact register a recess 14 or 15 provided in the associated blanket ends 7 or 8. The recesses 14 and 15 have rectangular and semi-circular shapes, respectively. Any bulging at the ends of the blanket 26 when it is clamped tightly outside the press is compensated for by chamfering the register pins 13 on both sides in the tangential direction. At the same time, the position of the blanket ends 7, 8 is accurately located in relation to the clamping devices 5, 6. To allow inspection of the position of the register pins 12, 13 and blanket recesses 14, 15, cut-outs 28 are provided in the clamping devices 5, 6 in the top clamping strip. The clamping device 5 for the front blanket end 7 is adapted to be located in the zero position circumferentially by means of a marking 24 (FIG. 6) on the front end 7 of the blanket 26 and an associated marking on the plate cylinder 2. In an alternative embodiment not shown in the drawings, the zero position of the clamping device 5 can also be obtained by allowing the tensioning spindle 3 to be positionable circumferentially against an adjusting stop.

Figure 5:
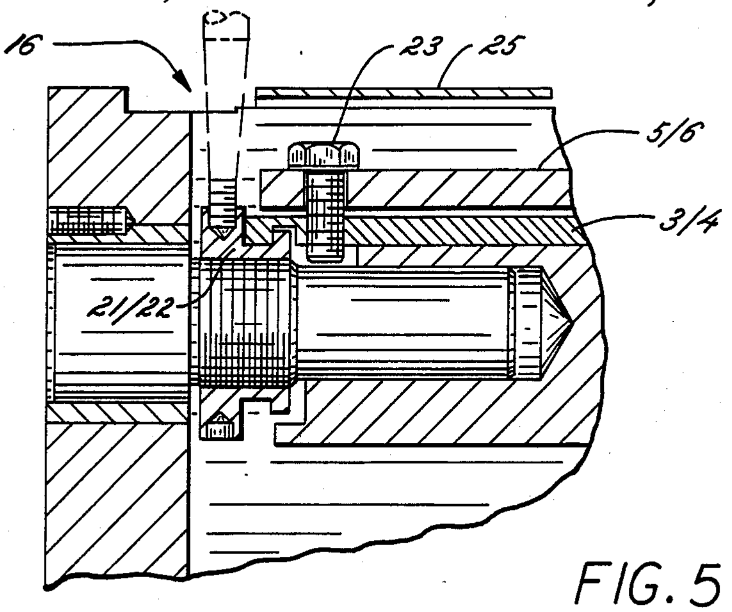
FIG. 5 illustrates an alternative embodiment of an axial adjustment device.

The clamping devices 5, 6 may be disposed with the rotatable tensioning spindles 3, 4 axially slidable in the blanket or plate cylinder 2 by means of an adjusting device 16. To this end, as shown in FIG. 5, the clamping device 5, 6 is axially slidable by means of clamping bolts 23 with the tensioning spindle 3, 4 by way of a screwthreaded ring 21, 22, respectively.

Figure 3:
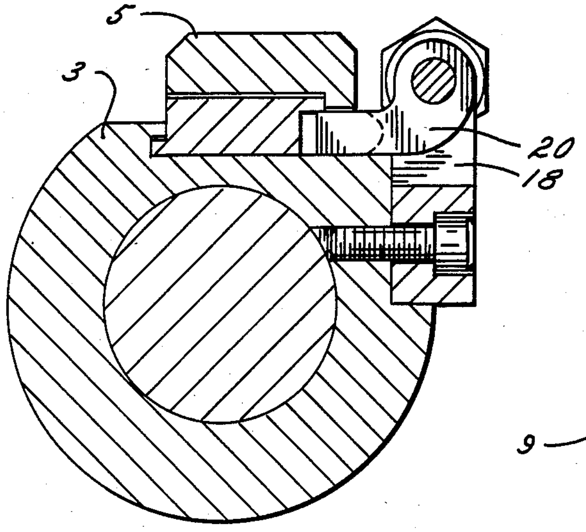
FIG. 3 is an enlarged sectional view taken along the line B—B in FIG. 1.
Figure 4:
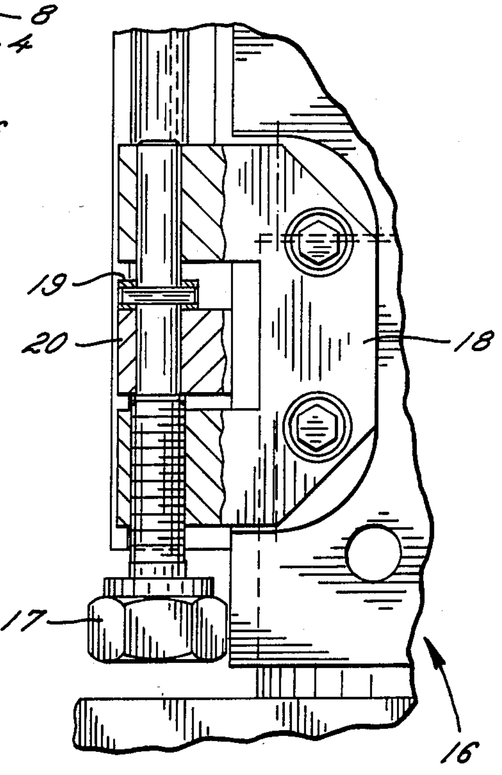
FIG. 4 is an enlarged view taken along the line of an axial adjustment device such as illustrated in FIG. 1.
Figure 9:
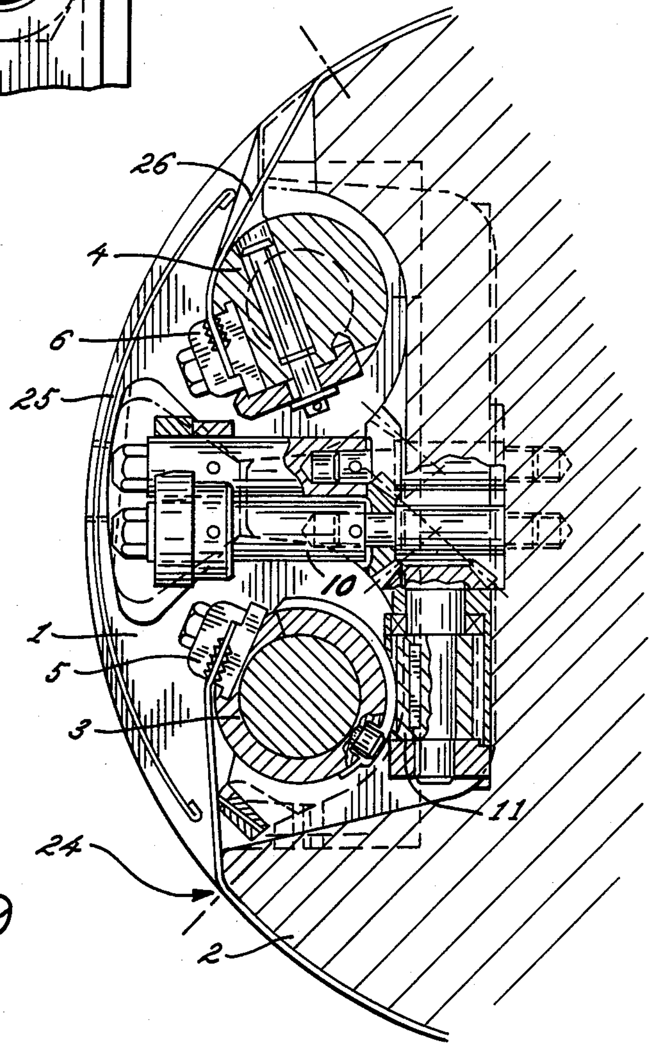
FIG. 9 is an enlarged sectional view of the blanket cylinderin accordance with FIG. 1.

Alternatively, the clamping devices 5, 6 may be axially displaceable on the tensioning spindles 3, 4. For this purpose, as shown in FIGS. 3 and 4, a bearing bracket 18 is fixed at each of the tensioning spindles 4, 5 and contains an adjusting bolt 17 bearing a driver 20 which is exactly positioned by means of an adjusting ring 19 and is positively connected to the bottom clamping strip of the clamping devices 5, 6. The clamping device 5, 6 is axially displaceable on the tensioning spindles 3, 4 by turning the adjusting bolt 17 in the bearing bracket 18. Readjustment circumferentially is effected in known manner by turning the tensioning spindles 3, 4 via the associated worm gear (FIG. 9).

In keeping with the invention, the blanket ends 7, 8 are inserted between the clamping strips of the clamping device 5, 6 outside the press until the recesses 14, 15 come into contact with the register pin 12, 13. Then the clamping bars of the clamping devices 5, 6 are secured by means of the clamping bolts 29. The clamping devices 5, 6 are then inserted with the blanket 26 in the blanket or plate cylinder 2 and the blanket 26 is carefully tensioned. An ink impression of the plate providing the guide lines for the selected-area, in-line varnishing operation is then printed on the blanket 26, being transferred by the printing material. The markings 24 are then provided at the front end 7 of the blanket and coincide with the markings on the blanket or plate cylinder 2. In order to cut out those areas which are not to be varnished, the blanket 26 together with the clamping devices 5, 6 is removed from the press and then reinserted and retensioned. Correct adjustment is immediately obtained when the markings 24 of the blanket 26 at the front end 7 thereof have been brought into register with the associated markings on the plate cylinder 2, and a test varnish run has been carried out if required. In the event of any register inaccuracies or if re-tensioning of the blanket 26 is necessary after a relatively large number of varnishing operations, this can be carried out axially by means of the adjusting devices 16 shown in FIGS. 5, 3 and 4, and circumferentially by means of the individually rotatable tensioning spindles 3, 4 via the worm gear 11 shown in FIG. 9.

We claim as our invention:

1. A mechanism for the accurate register alignment of a blanket on a cylinder for selected-area, in-line varnishing in a rotary press comprising, tensioning spindles provided in an axis-parallel well in the plate cylinder and having clamping devices for the ends of said blanket, said spindles being rotatable independently of one another in order to tangentially pull the blanket over the cylinder surface by means of an adjustment mechanism, each clamping device is provided with registration means comprising at least two axially spaced radially directed register pins which are situated beneath the outer surface of the cylinder and which cooperate in exact register with two recesses provided in the associated blanket ends, said clamping device for the front blanket end being adapted to be fixed in a zero position by alignment of first marking means on the blanket proximate the front end of the blanket and associated second marking means on said cylinder, and adjustment means associated with each of said clamping devices for axially displacing said clamping devices and said rotatable tensioning spindles in said cylinder.

2. A mechanism according to claim 1 wherein said clamping devices are arranged for axial displacement in said cylinder on the rotatable tensioning spindles by means of an adjustment device.

3. A mechanism according to claim 2 wherein said register pin is of circular cross section and the register pin is chamfered on both sides in the direction perpendicular to the center line of said cylinder.

* * * * *